Sept. 18, 1962   I. C. LUCIDI   3,054,433
METHOD OF DECORTICATING SESAME SEEDS
Filed Feb. 13, 1956   2 Sheets-Sheet 1

ITALO C. LUCIDI
INVENTOR
HUEBNER, BEEHLER,
WORREL & HERZIG
ATTORNEYS
BY
Richard M. Worrel Sept. 18, 1962  I. C. LUCIDI  3,054,433
METHOD OF DECORTICATING SESAME SEEDS
Filed Feb. 13, 1956  2 Sheets-Sheet 2
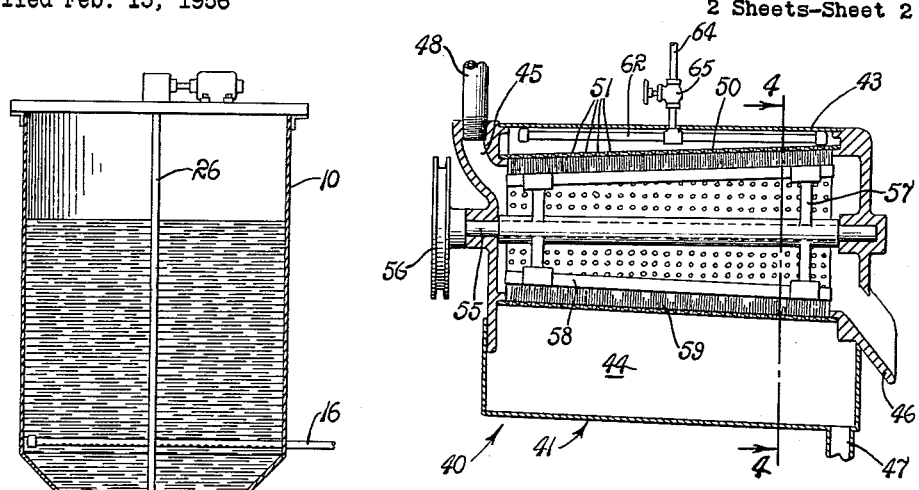
FIG. 2.
FIG. 3.
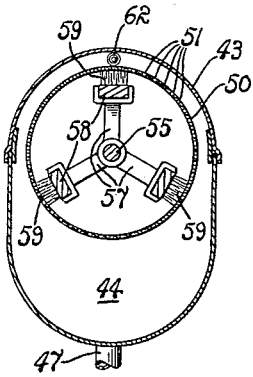
FIG. 4.
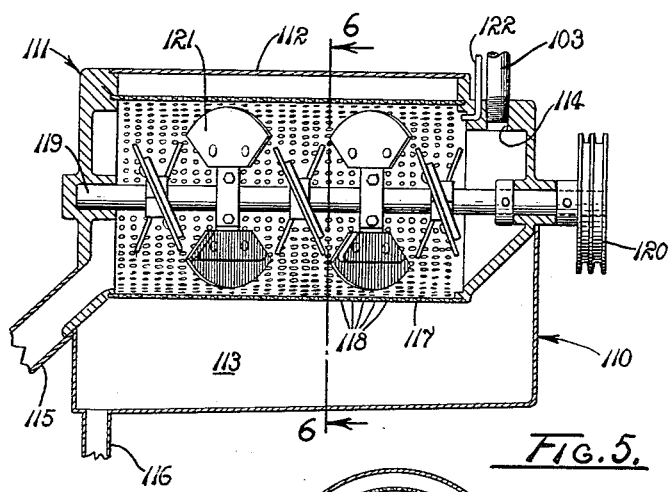
FIG. 5.
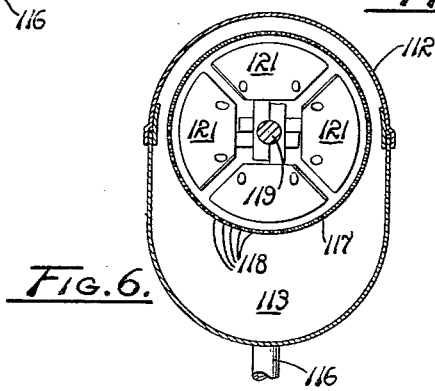
FIG. 6.
ITALO C. LUCIDI
INVENTOR
HUEBNER, BEEHLER,
WORREL & HERZIG
ATTORNEYS
BY
Richard M. Worrel September 18, 1962

3,054,433
Patented Sept. 18, 1962

3,054,433
METHOD OF DECORTICATING SESAME SEEDS
Italo C. Lucidi, 4120 Platt Ave., Fresno, Calif.
Filed Feb. 13, 1956, Ser. No. 565,001
11 Claims. (Cl. 146—221.9)

The present invention relates to the decortication of seeds and more particularly a method especially useful in the decortication of sesame seeds.

Sesame seeds are small, oval-shaped, compressed seeds having inner portions or kernels and a plurality of outer layers or hulls covering the kernels. The outer kernels are tan to dark brown in color and adhere tightly to the kernels. Generally, to be commercially useful, the outer hulls of the seeds must be removed since these hulls impart undesirable color and taste characteristcis to the seeds. The decortication of sesame seeds is exceedingly difficult because of their unusually tenacious hulls. Even after the hulls have been removed from the kernels, however, their actual separation from the kernels is possibly an even more difficult problem. Sesame seed decortication is rendered especially arduous because of the myriad varieties of sesame seeds in any given harvest in which the yield sometimes contains as high as one hundred and fifty different varieties of seeds with as many different characteristics as to hull tenacity, color, flavor, and the like.

In the past, the hulling of sesame seeds has been primarily a batch operation requiring approximately a week or longer to accomplish. A popular but primitive method of this nature is practiced in many countries today and includes the steps of soaking sesame seeds in an aqueous bath for forty-eight to ninety-six hours, agitating the seeds by having an attendant walk through the bath, removing the seeds from the bath and spreading them in the sun, replacing the seeds in the bath after a period of drying whereupon the skins of the seeds after a protracted period float to the top and the seeds settle to the bottom, the final separation being effected by decanting.

There are many disadvantages to the described method, namely; not all of the skins are removed; there are delays in the process which increase the danger of molding; exposures to the air throughout the process cause discoloration; results are not uniform; and such methods are time consuming, expensive and laborious. In countries where the cost of labor is high, this method has been economically prohibitive thereby discouraging the commercialization of sesame seeds.

Attempts have also been made in the past to decorticate sesame seeds in a dry state by means of a burr mill or by similar abrasive treatment or even to use such abrasive means after soaking as above discussed. It has been found that this is unsatisfactory, in addition to the disadvantages already named, in that such vigorous abrasive action cracks many of the kernels of the seeds.

The essence of the present invention resides in the discovery of a method and apparatus for decorticating sesame seeds and the like, in a substantially continuous process, in a minimum of time, and wherein the results obtained are vastly superior to those of known prior art methods and apparatus as to uniformity of result, improved color, less waste and damage to the resultant kernels, improved flavor, and minimized deterioration. Although the invention is described in relation to sesame seeds, it is to be understood that it has application to the decortication of other seeds having similar qualities and characteristics.

Accordingly, an object of the present invention is to provide improvements in the decortication of seeds and especially sesame seeds and the like.

Another object is to reduce the time previously required for the decortication of sesame seeds.

Another object is to render the decortication of sesame seeds a substantially continuous process rather than entirely a batch operation.

Another object is to enable the decortication of sesame seeds of many varieties at the same time and yet to yield decorticated kernels of substantially uniform characteristics.

Another object is to remove the hulls from the kernels of seeds and thereafter to separate the hulls and the kernels.

Another object is to avoid the crushing, bruising and cracking of kernels of sesame seeds during the decortication thereof.

These and other objects will become more fully apparent upon reference to the following description.

In the drawings:

FIG. 2 is a somewhat enlarged vertical section of a tank of the apparatus shown in FIG. 1.

FIG. 3 is a somewhat enlarged vertical section of a separating device of the apparatus of FIG. 1.

FIG. 4 is a transverse section taken at a position represented by line 4—4 of FIG. 3.

FIG. 5 is a somewhat enlarged vertical section of a rinsing and drying device employed in the apparatus of FIG. 1.

FIG. 6 is a transverse section taken at a position represented by line 6—6 of FIG. 5.

Figure 1:
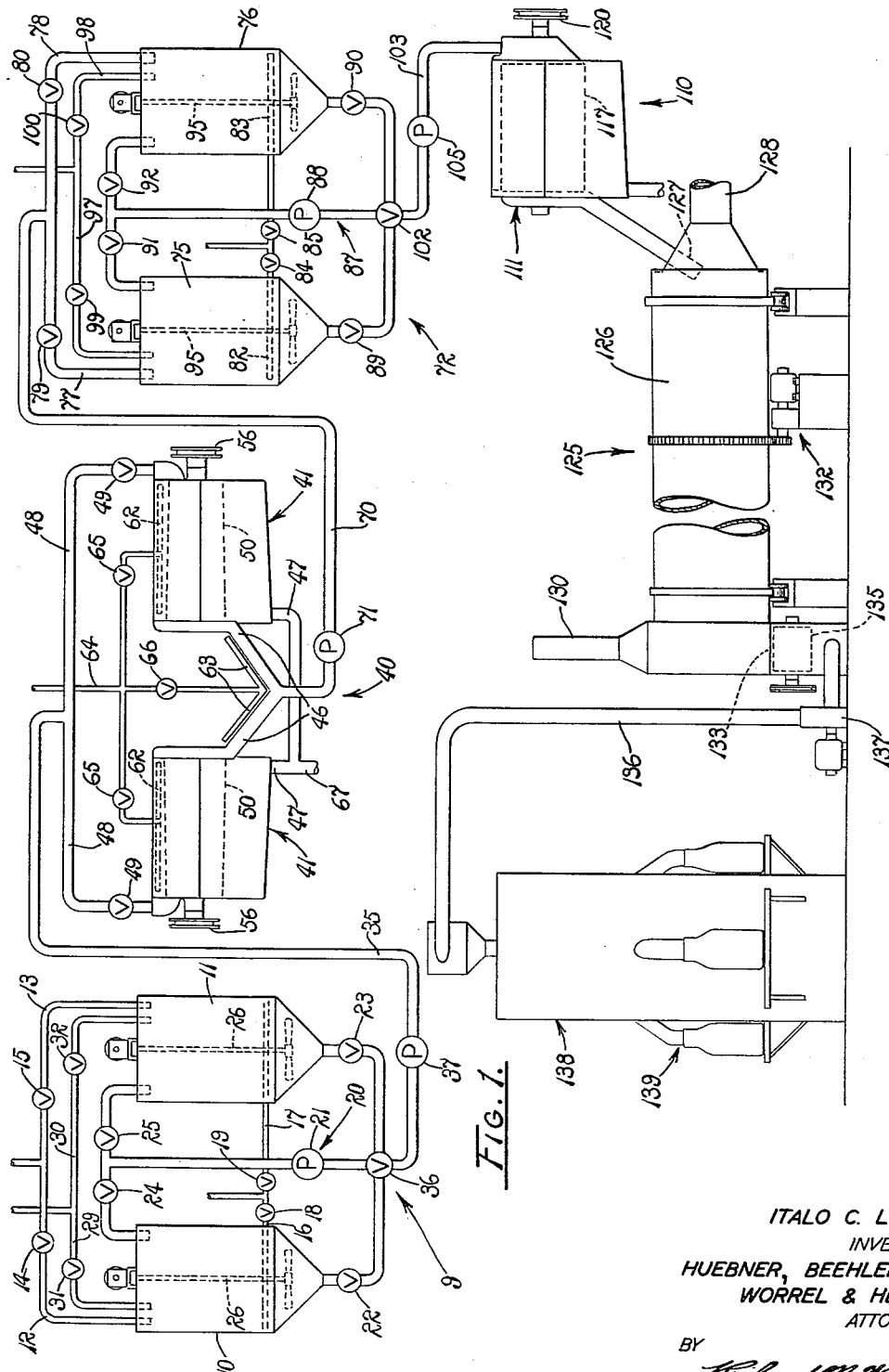
FIG. 1 is a diagrammatic representation of an apparatus for performing the method of the present invention.

Prior to a more detailed discussion of the present invention and to facilitate understanding, preliminary attention is invited to the following steps involved in the improved method of decorticating seeds:

(1) The seeds are initially agitated in a heated aqueous bath for a period sufficient substantially to saturate the seeds.

(2) Alkaline material is added to the bath and agitation is continued for a period sufficient substantially to saturate the hulls of the seeds. At this point most of the hulls are removed and finely divided so that a slurry results.

(3) The slurry consisting of kernels, alkaline water and hull fragments is brushed against a perforate screen to force the hull fragments through the screen thereby to separate the hulls from the kernels.

(4) The kernels which have been removed from the hulls are then neutralized and washed.

(5) Surface water is removed from the kernels and the kernels are dehydrated.

The invention is best understood by reference to the drawings wherein is shown a suitable apparatus for carrying out the steps of the process.

A soaking stage 9 is shown in FIG. 1 including a pair of tanks 10 and 11 having open upper ends and lower funnel-shaped outlet ends. Fluid delivery conduits 12 and 13 extend into the upper ends of the tanks, and are connected to a suitable source of water, not shown, for supplying water to the tanks. Valves 14 and 15 are provided in the delivery conduits for controlling water flow to the tanks. The water in the tanks is heated by steam conduits 16 and 17 connected to a suitable source of steam, also not shown, extended into the tanks, and having valves 18 and 19 therein for regulating or precluding steam flow.

A fluid circulating system 20 provides a pump 21 having a pair of inlet ends individually connected to the outlets of the tanks and a pair of outlet ends extended into the upper ends of the tank preferably immersed in the fluid therein. Outlet valves 22 and 23 and inlet valves 24 and 25 are provided in the inlet and outlet ends, respectively, of the circulating system for individually controlling circulatory flow through the tank. Whole sesame seeds, not shown, are deposited by any suitable means in the open upper ends of the tanks and are vigorously mixed or agitated in the water by circulation through the system 20. Rotary mixers 26 are extended downwardly into the tanks and serve to prevent clogging at the outlets and further contribute to proper mixing and agitation in the bath.

Alkaline material is introduced into the tanks through alkaline delivery conduits 29 and 30 which extend into the tanks and have valves 31 and 32 for controlling alkaline flow to the tanks. An interstage conduit 35 is connected to the outlets of the tanks through the inlet ends of the circulating system by means of a control valve 36 having a first position connecting the outlet of tank 10 to the interstage conduit and the outlet of tank 11 to the circulating system, and a second position connecting the outlet of tank 10 to the circulating system and the outlet of tank 11 to the intersage conduit.

The first and second steps of the present invention, as briefly set out above, are carried out in the soak stage 9 as follows. Assuming the tanks 10 and 11 to be empty, the valves 14, 15, 18, 19, 22, 23, 24, 25, 31 and 32 to be closed, and the mixers 26 stationary, valve 14 is opened and water is delivered to tank 10. Valve 14 is then closed. Steam valve 18 is opened and the water in tank 10 heated to a temperature of from at least about 100° F. to at least about 160° F. perferably staying within a range of from at least about 110° F. to at least about 140° F. within which range it is maintained throughout the performance of the step. Temperatures much in excess of the maximums indicated tend to cause undesirable extraction of oil from the seeds. The outlet valve 22 is then opened, the valve 36 placed in its second position as above described, the valve 24 opened, and the pump 21 started to cause circulation of the water in tank 10. Additionally, the mixer 26 for tank 10 is rotated. Sesame seeds are then dumped into tank 10 wherein they are agitated and soaked by circulation with the heated water. It is to be noted that the ratio of seeds to water is not critical but in one commercial installation 3,000 gallons of water are employed for each 1,000 pounds of seeds.

The initial soaking is continued for about five minutes or until the seeds are substantially saturated with water at which time they contain approximately 50% by weight of water. Then while the seeds and water are still circulating and the temperature maintained within the indicated range valve 31 is opened and alkali is introduced into tank 10 until the pH of the bath reaches approximately 9.5. The valve 31 is then closed. A caustic soda solution is found to be excellently suited for this purpose and, if used, is added until there is a concentration of approximately 2% by weight of caustic soda in solution in the bath. This corresponds to a pH of approximately 9.5. Several factors are to be noted at this point. Absorption of alkali by the seed kernels has a deleterious effect on the kernels and it has been determined that a pH much in excess of 9.5 is too strong in this regard. However, the stronger the alkalinity of the bath, the more effect it has in weakening and removing the hulls. Therefore, as a precaution against excessive alkali absorption by the kernels and to permit thorough saturation of the hulls with alkali, the kernels are initially saturated with water by the soaking step described thus substantially preventing excessive alkali entry into the kernels, at least as long as the seeds only remain in the alkaline bath for a pre-determined period, as discussed below.

The seeds are continuously recirculated and thereby vigorously agitated in the alkaline bath for approximately fifteen to thirty minutes or until the hulls are thoroughly saturated in alkaline solution. Close observation reveals that the hulls of the seeds are removed from the kernels during this recirculation in the alkaline solution and are divided into minute fragments of sizes considerably less than the kernel sizes. Inasmuch as sesame seeds generally have at least two outer hulls of darker color which are to be removed, saturation and removal of the hulls is reached when the ligher inner kernels are visible.

Just before the seeds in tank 10 have been sufficiently soaked and agitated in the heated alkaline bath, valve 15 is preferably opened to deliver water to tank 11, the steam valve 19 opened to heat the water to within the same temperature limits mentioned above in relation to tank 10, and the mixer 26 in tank 11 rotated. When the seeds in tank 10 have completed their alkaline soak period, the mixer 26 in tank 10 is stopped, valve 24 is closed, steam valve 18 closed, control valve 36 shifted to its first position and valves 23 and 25 for tank 11 opened in the order named. The slurry resulting from the action described in tank 10 and including kernels, hull fragments, and alkaline water is pumped from tank 10 through its outlet and the valve 36 into the interstage conduit 35 by pump 37 for transmission to the separating stage 40, which will be subsequently discussed in greater detail.

In the meantime, heated water is circulating in tank 11. The sesame seeds are then added to the bath and soaked until saturated, as before. Thereafter, alkali is introduced through conduit 30 by opening valve 32 and the process repeated as above described in regard to tank 10. Thus, seeds are being readied in tank 11 for delivery to the separating stage 40 while a preceding batch from tank 10 is being treated in the separating stage. Obviously when a batch in tank 11 is nearing completion a new batch is started in tank 10 so that flow through the interstage conduit 35 to the separating stage is substantially continuous.

The slurry from the tank 10 is pumped through the conduit 35 to the separating stage 40 into one or both of a pair of separators 41. Two separators are provided in order to handle the volume of flow and thus either one or both may be used, as needed. More may be employed if desired. Since the separators are identical in construction, only one is described in detail.

Referring to FIGS. 3 and 4, each separator 41 has an elongated housing 43 providing an internal chamber 44 and having opposite ends. The housing has an upper slurry inlet 45 at one end of the chamber and downwardly extended lower kernels and residue outlets 46 and 47, respectively, at the opposite end of the chamber from the inlet and spaced below the inlet. A pair of slurry delivery conduits 48 having valves 49 therein connect the inter-stage conduit 40 to the separator inlets 45.

Each separator 41 has an elongated substantially frusto-conical sieve 50 mounted in the housing 43 having an end of minimum diameter in communication with the slurry inlet 45 and a diverging end of maximum diameter in communication with the seed outlet 46. The sieve axis is in substantially horizontal position and the sieve has a plurality of perforations 51 throughout its periphery which provide communication between the slurry inlet and the residue outlet 47. The perforations are of such a size as to permit passage of hull fragments but not the kernels of sesame seeds treated in the soaking stage 9.

An elongated shaft 55 is rotatably journaled in the housing 43 axially of the sieve 50, and a driving pulley 56 is secured at one end of the shaft externally of the housing. A plurality of pairs of arms 57 are radially extended in substantially equally spaced relation from the shaft at opposite ends thereof within the sieve. Elongated brushes 58 having relatively soft bristles 59 are mounted on corresponding pairs of arms with the bristles in light contact with the sieve for brushing over the perforations 51 during rotation of the shaft. This achieves the gentle but effective action desired.

An elongated internal spray conduit 62 is mounted within the housing 43 above the sieve 50 for spraying rinse water over the sieve while the brushes 58 are rotating. The kernel outlets 46 of the separators 41 are upwardly disposed channel members and extend downwardly to a common junction. External spray conduits 63 are mounted over the kernel outlets for spraying water downwardly therein. A supply conduit 64 is connected to the internal and external spray conduits 62 and 63 and suitable valves 65 and 66 are provided for controlling the spray of water. It is also to be noted that the residue outlets 47 are connected to a common drainage pipe 67 which extends to a sewer or other waste outlet.

The third step of the process of this invention as briefly set forth above is carried out in the separating stage 40 as follows.

Either or both valves 49 are opened and slurry from the conduit 35 enter an inlet 45. Assuming the brushes 58 to be rotating and the spray conduits 62 and 63 to be turned on, the slurry is gently brushed against the sieve 50 while being thoroughly rinsed. The hull fragments are brushed through the perforations 51 and are flushed into the bottom of the chamber and out the residue outlet 47. Rinse water from conduit 62 washes the alkaline water through the perforations for drainage out of the outlet 47. The kernels cannot pass through the sieve and are thus washed downwardly along the sieve into the kernel outlet, being rinsed by the water spray during such travel. The shaft preferably rotates at a speed of approximately 400 revolutions per minute so that the brushes gently wipe the kernels over the sieve. The lightness of the bristles also aids in preventing kernel crushing, cracking, or bruising. The kernels are further washed downwardly in the outlet 46 by spray water from the conduit 68 and into an interstage conduit 70 where the rinse water and kernels are pumped by pump 71 into a neutralizing stage 72.

The neutralizing stage 72 conveniently is of similar construction to the soaking stage 9 and thus includes a pair of tanks 75 and 76 having open upper ends and lower outlet ends. Fluid delivery conduits 77 and 78 extend into the upper ends of the tanks, are connected to the interstage conduit 70, and have valves 79 and 80 therein for controlling flow of kernels and rinse water to the tanks. Heat is supplied by conduits 82 and 83 which include steam valves 84 and 85. A circulating system 87 includes a pump 88 having inlet ends connected to the outlets of the tanks and outlet ends extended into the tops of the tanks adapted to be immersed in a bath therein. Outlet valves 89 and 90 and inlet valves 91 and 92 are located in the inlet and outlet ends of the circulating system, respectively. Rotary mixers 95 are also extended downwardly in the tanks, and acid delivery conduits 97 and 98 are extended into the upper ends of the tanks having valves 99 and 100 therein. A two-way control valve 102 interconnects the outlet of tank 75 with an interstage conduit 103 and the outlet of tank 76 to the circulating system in a first position and in a second position connects the circulatory system with the outlet of tank 75 while connecting the interstage conduit 103 to the outlet of tank 76.

The fourth step of the present process may now be described in connection with the apparatus of the neutralizing stage 72 set forth above. Assuming tanks 75 and 76 are empty, the valves 79, 80, 84, 85, 89, 90, 91, 92, 99, and 100 to be closed, and the mixers 95 stationary, valve 79 is opened to permit rinse water and kernels to be pumped into tank 75 by pump 71 until it is substantially full and the valve 79 is then closed. The mixer 95 is rotated, the steam valve 84 opened, the valves 89 and 91 opened and the pump 88 started to circulate kernels and water through the tank. The central valve 102 is set in its second position, as above described. The temperature of the bath may vary widely but because of the residual heat of the seeds, the tap water utilized for the bath usually increases in temperature to approximately 70° F. to 90° F. The seeds entering the bath have a pH of approximately 10. The valve 99 is opened to add sufficient acid to the bath to reduce the pH of the acid and bath to slightly below 7. In this regard, the natural pH of the seed kernels is 6 and this is preferably approximately matched during the described neutralization. Citric acid has been found to be excellently suited for this purpose. The kernels are gently agitated by recirculation in the acidic bath for a period of approximately five to ten minutes or for a time sufficient to neutralize any residual alkalinity in the kernels and thereby to avoid any undesirable action on the color or oil of the kernels. While the kernels in tank 75 are going through their neutralizing cycle, valve 80 is opened to fill tank 76 with a new charge of kernels and rinse water from the separating stage 40. When the kernels in tank 75 have been sufficiently neutralized, the valve 91 is closed, the mixer 95 and steam valve 84 are turned off, and the valve 102 shifted to its first position as above described. The neutralized kernels are then pumped through conduit 103 by pump 105 to a rinsing and drying stage 110 to be more fully described hereinafter. With the valve 102 in its first position the valves 90 and 92 are opened, the steam valve 85 and mixer in tank 76 turned on, and acid added by opening valve 100. Neutralization of the kernels in tank 76 is then carried on as above described in relation to tank 75. In this manner, as with the soaking stage 9, a substantially continuous flow is maintained in conduit 103. While in most instances it is preferable to neutralize by means of a slightly acidic bath, as described, it has also been found satisfactory simply to continue rinsing until all harmful alkali has been removed.

The final rinsing and drying stage 110 provides a rinser and dryer 111 best seen in FIGS. 5 and 6, having a housing 112 with an internal chamber 113, an upper inlet end 114, a downwardly extended outlet chute 115 at an end opposite to the inlet end and spaced therebelow, and a lower residue outlet 116. A cylindrical screen 117 having apertures 118 therein is mounted substantially horizontally in the housing. A shaft 119 is rotatably mounted in the housing 112 axially of the screen. A pulley 120 on the shaft provides rotation thereof from any suitable source of power, not shown. A plurality of resiliently flexible paddles 121 are radially extended in substantially helical formation from the shaft in closely spaced relation to the screen. A spray conduit 122 preferably having a diffusing nozzle is extended into the housing and directed within the screen.

In carrying out the fourth step of the process, the substantially neutralized kernels are pumped in rinse water into the inlet 114 of the rinser 111 by pump 105. The shaft 119 is rotated at a speed of approximately 1800 revolutions per minute so that the paddles 121 throw the kernels outwardly against the screen thereby to remove surface water from the kernels by centrifugal action. The apertures 118 are too small to pass the kernels. As the kernels enter the rinser they are again subjected to a brief spray from conduit 122 which acts to rinse the kernels of any of the acidic solution which might remain thereon. The helical formation of the paddles moves the kernels along the screen and into the outlet chute 115 which leads to a dehydrating stage 125. The water removed from the kernels in the rinser and dryer 111 is drained off through outlet 116.

The dehydrating stage 125 includes a well known rotary, tumble-action, drying kiln 126 having a kernel inlet 127, a hot air inlet end 128, and an upwardly extended hot air outlet 130. The kiln includes rotary driving means generally indicated at 132 for gently tumbling the kernels while they are subjected to air at a temperature of approximately 450° F. for a period sufficient to reduce the moisture content of the kernels to from 15 to 20% by weight. The kiln is downwardly inclined from its inlet 127 to a kernel outlet 133 to discharge dehydrated kernels through a metering device 135 into a pipe 136 where they are blown upwardly by blower 137 into a clipper 138 and finally into a sacker 139. In one installation the kernels are passed through the kiln at a rate of approximately 900 to 1000 pounds per minute. The clipper, as is well known in the art, removes any hull fragments, particles, or debris prior to sacking of the kernels.

It will be evident from the foregoing that a substantially continuous process and apparatus for decorticating sesame and like seeds has been provided even though certain steps thereof are batch in nature.

Sesame seeds are entirely processed in from one to one and a half hours as contrasted with a usual period of five days by current commercial practices. The resultant decorticated seeds are more uniformly cleaned of their hulls, less damaged by handling, of a much higher percentage of whole kernels, and of markedly higher quality than previously attainable. The problems of mildew and other discoloration or contamination are avoided. The apparatus can be readily controlled by a single attendant and thus the superior results are quite economically attained.

Although the invention has been herein shown and described in what is conceived to be the most practical and preferred method and embodiment, it is recognized that departures may be made therefrom within the scope of the invention, which is not to be limited to the details disclosed herein but is to be accorded the full scope of the claims so as to embrace any and all equivalent methods, devices, and apparatus.

Having described my invention, what I claim as new and desire to secure by Letters Patent is:

1. A method of decorticating sesame seeds having hulls comprising soaking the seeds in water which is substantially neutral until the seeds are substantially saturated, subsequently soaking the seeds in an alkaline solution until the hulls are impregnated with the alkaline solution and weakened thereby while the internal portions of the seeds remain substantially free of said alkaline solution, agitating the seeds to remove them from the hulls and to reduce the particle size of the hulls to substantially less than that of the internal portions of the seeds, and separating the hull particles from the internal portions of the seeds.

2. A method of decorticating sesame seeds having outer hulls and inner kernels comprising agitating the seeds in a heated aqueous bath which is substantially neutral until the seeds are substantially saturated with water, subsequently adding alkali to the bath and continuing to agitate the alkaline solution and seeds until the hulls of the seeds are substantially saturated and reduced to minute particle size separated from the kernels, and straining the kernels from the solution and hull particles.

3. A method of decorticating sesame seeds having kernels and hulls tenaciously adherent to the kernels comprising the steps of soaking whole seeds in an agitated aqueous bath which is substantially neutral having a temperature of from at least about 100° F. to at least about 160° F. for a period sufficient substantially to saturate the seeds, continuing to soak the saturated seeds in an agitated alkaline bath at a temperature from at least about 100° F. to at least about 160° F. until the hulls are reduced to minute particle size and removed from the kernels to form a slurry in the alkaline bath; separating the kernels from the slurry; neutralizing the kernels in an acidic bath; and dehydrating the neutralized kernels.

4. A method of decorticating sesame seeds having outer hulls and inner kernels comprising circulating the sesame seeds in an aqueous bath which is substantially neutral at a temperature of from at least about 100° F. to at least about 160° F. until the seeds contain approximately 50 percent by weight of water, adding alkali to the bath until the pH of the bath is approximately 9.5, and continuously re-circulating the alkaline bath and seeds until the hulls are reduced by the alkali to minute fragments and are removed from the kernels to form a slurry, separating the kernels from the slurry, gently circulating the kernels in an acidic bath until the residual alkali of the kernels is substantially neutralized, rinsing the kernels, and drying the rinsed kernels.

5. A method of decorticating sesame seeds having kernels and outer hulls comprising agitating the seeds in a substantially neutral aqueous bath in a ratio of approximately one pound of seeds to each three gallons of aqueous bath at a temperature of from at least about 100 degrees F. to at least about 160 degrees F. for a period of approximately five minutes until the hulls and kernels of the seeds have reached a condition of approximate maximum saturation, adding caustic soda to the bath until the bath reaches a pH of at least about 9.5 and continuing the agitation for a period of from 15 to 30 minutes until the hulls are substantially saturated with alkaline solution and comminuted and the kernels are still substantially free of alkalinity, separating the kernels from the hulls of the seeds, gently stirring the kernels in an acidic bath for a period sufficient to neutralize any caustic soda remaining thereon, rinsing the acidic bath from the kernels, subjecting the kernels to a centrifugation at a velocity of approximately 1800 r.p.m. to whirl the surface water therefrom, and dehydrating the kernels to a moisture content of approximately fifteen to twenty percent by weight.

6. A method of decorticating sesame seeds having kernels and outer hulls comprising pumping the seeds in an aqueous bath that is substantially neutral at a temperature of from at least about 100 degrees F. to 160 degrees F. in a closed circuit until the seeds are substantially saturated with water, continuing to pump the seeds in the aqueous bath at a temperature of from 100 degrees F. to 160 degrees F. in the closed circuit while adding alkaline material to the bath in a quantity sufficient to raise the pH thereof to approximately 9.5 and for a period sufficient to remove the hulls from the kernels and reduce the hulls to minute particle sizes, separating the kernels from the hulls, neutralizing any residual alkalinity remaining on the kernels, subjecting the kernels to centrifugation to remove surface water therefrom, and dehydrating the kernels to a moisture content of approximately 15 to 20 percent by weight.

7. In a method of decorticating sesame seeds having hulls and kernels, the steps of soaking the seeds in water which is substantially neutral until they are substantially saturated, subsequently soaking the saturated seeds in an aqueous alkaline bath until the hulls are substantially saturated with alkaline solution but the kernels remain substantially free of alkalinity, and agitating the seeds in the alkaline bath to remove the hulls from the kernels.

8. In a process for the decortication of sesame seeds, the steps of agitating the seeds in a dilute aqueous alkali solution having a pH of approximately 9.5 at a temperature of from about 100° F. to about 160° F. for a period of from 15 to 30 minutes until the hulls are reduced to minute particle size and separated from the kernels of the seeds, and washing the hull particles and aqueous alkali solution from the kernels.

9. A method of decorticating sesame seeds comprising the subjection of the seeds to a substantially neutral aqueous bath at a temperature from about 100° F. to about 160° F. until the seeds are substantially saturated with water, agitating the seeds in a dilute aqueous alkali solution of a strength and for a period sufficient to reduce the hulls to minute particle size, and then rinsing the hull particles and alkali solution from the decorticated seeds.

10. The method of claim 9 in which the aqueous alkali solution contains approximately 2% by weight of a sodium base alkali, is maintained at a temperature of from about 100° F. to about 160° F., and the seeds are agitated therein for from about 15 to about 30 minutes.

11. A method of decorticating sesame seeds which comprises subjecting said seeds to the action of dilute aqueous caustic alkaline solution of a concentration of from about 0.5° Bé. to about 5° Bé., at a temperature between 60° C., and 70° C. for an extended period up to two hours, and then subjecting the thus-treated seeds to frictional decortication.

References Cited in the file of this patent

UNITED STATES PATENTS

| | | |
|---|---|---|
| 661,996 | Jordan | Nov. 20, 1900 |
| 1,103,167 | Wood | July 14, 1914 |
| 2,007,693 | Ruter | July 9, 1935 |
| 2,217,112 | Hamring | Oct. 8, 1940 |
| 2,329,403 | Logue | Sept. 14, 1943 |
| 2,815,783 | Horvilleur | Dec. 10, 1957 |